Figure 1:
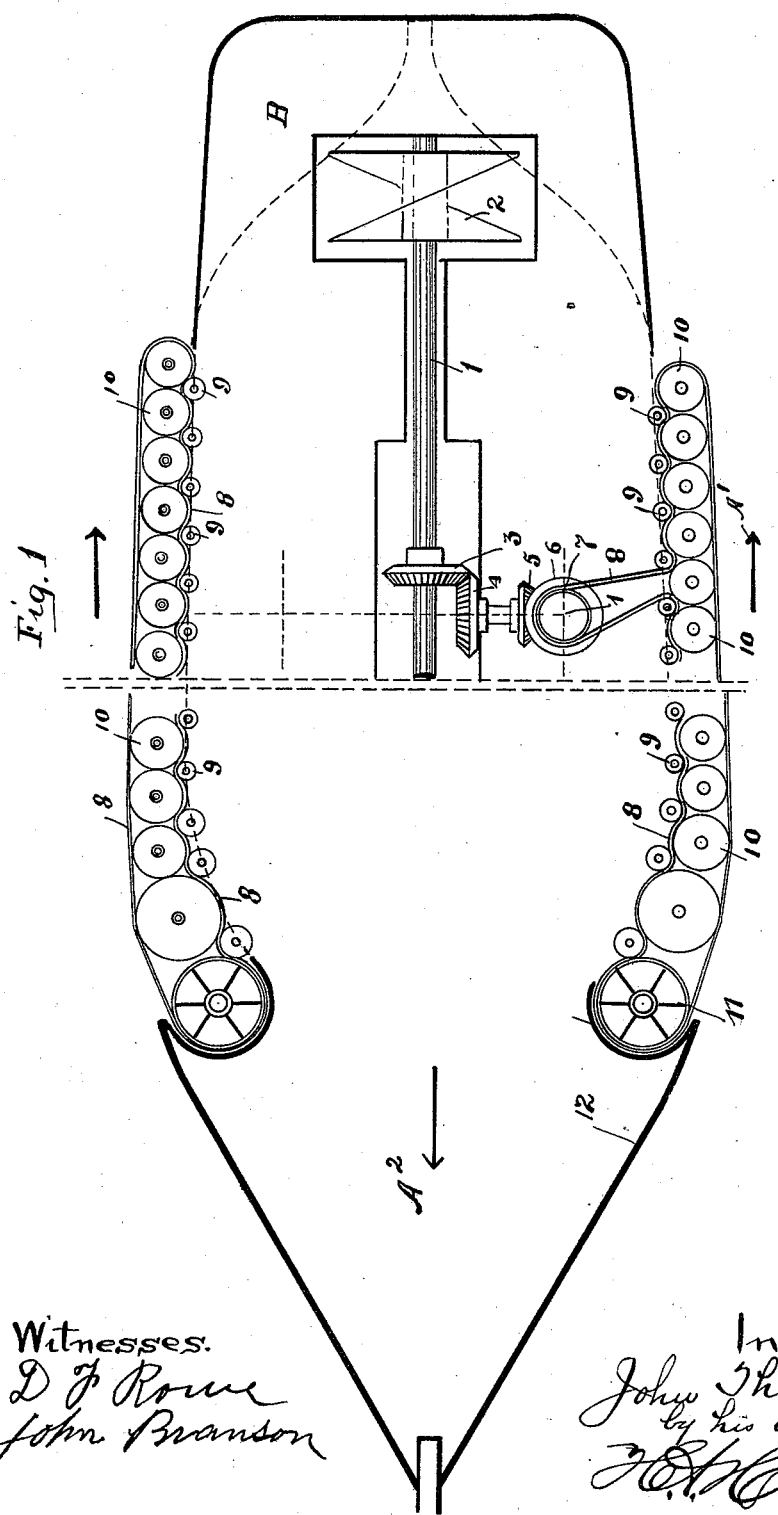

(No Model.)  5 Sheets—Sheet 1.

J. THOMAS.
MEANS FOR REDUCING FRICTION BETWEEN SHIPS AND WATER.

No. 532,221. Patented Jan. 8, 1895.

Witnesses.
D. F. Rowe
John Branson

Inventor.
John Thomas
by his atty

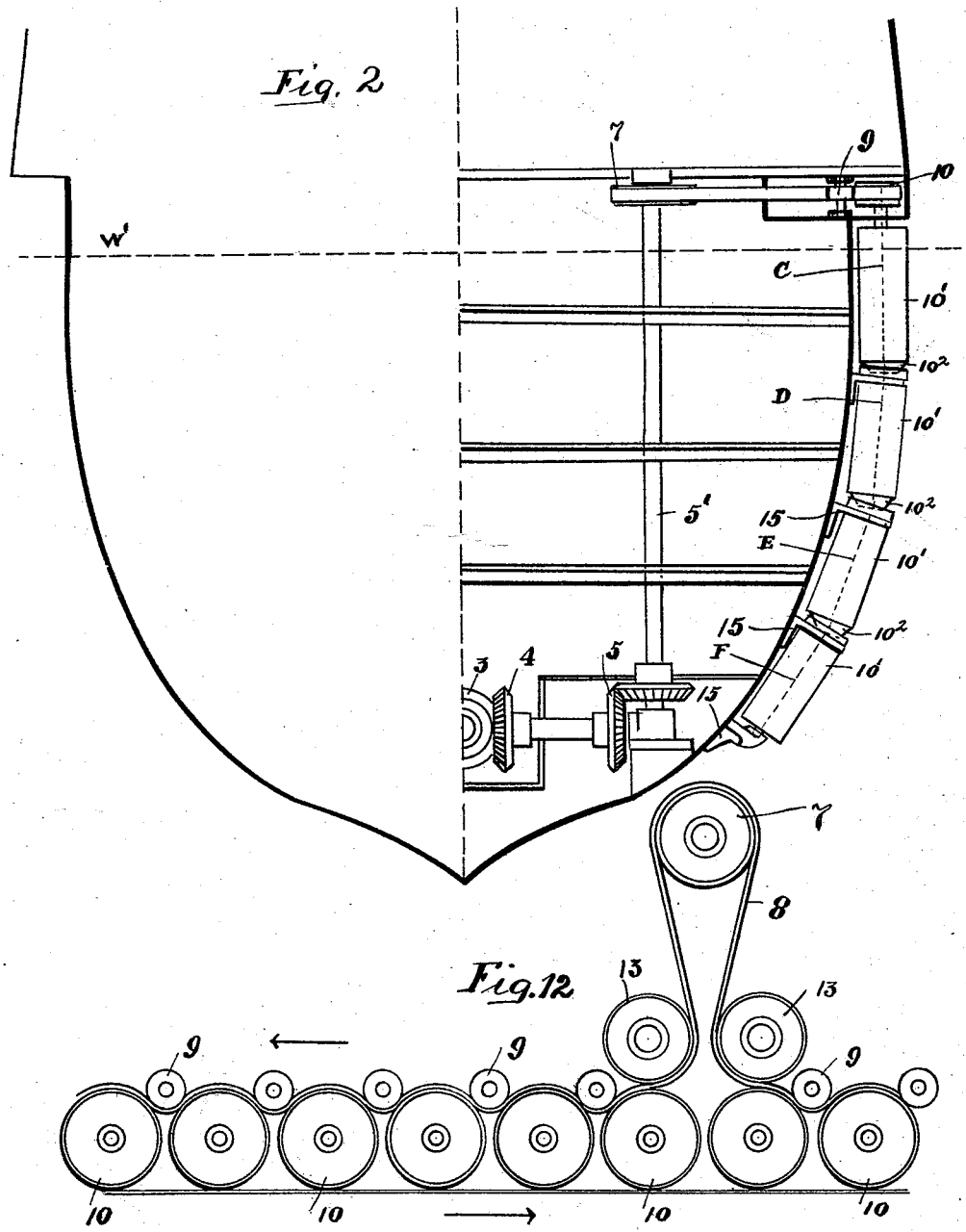

(No Model.) 5 Sheets—Sheet 3.
J. THOMAS.
MEANS FOR REDUCING FRICTION BETWEEN SHIPS AND WATER.
No. 532,221. Patented Jan. 8, 1895.
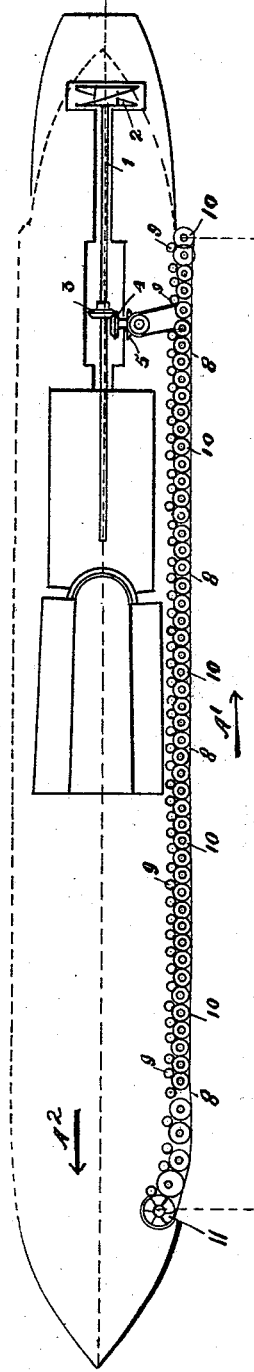
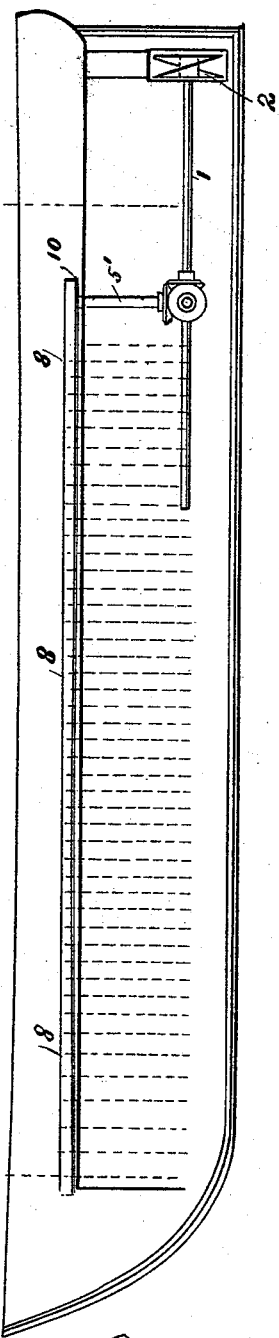
Witnesses.
Inventor (No Model.) 5 Sheets—Sheet 4.

J. THOMAS.
MEANS FOR REDUCING FRICTION BETWEEN SHIPS AND WATER.

No. 532,221. Patented Jan. 8, 1895.

Witnesses.
D. F. Rowe
John Branson

Inventor.
John Thomas
by his atty.

(No Model.) 5 Sheets—Sheet 5.
J. THOMAS.
MEANS FOR REDUCING FRICTION BETWEEN SHIPS AND WATER.
No. 532,221. Patented Jan. 8, 1895.
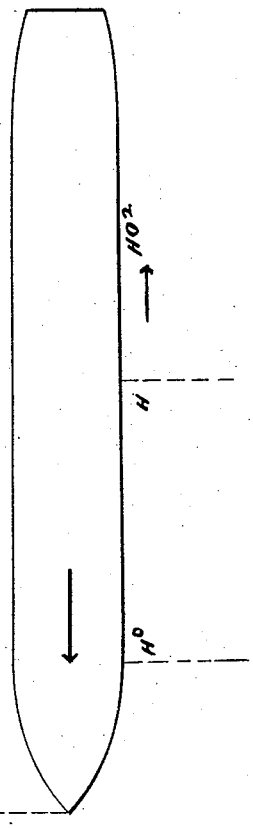
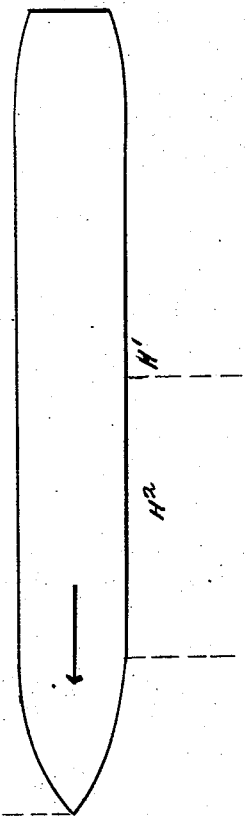
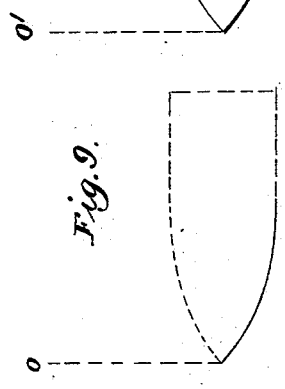
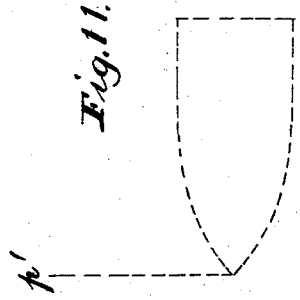
Witnesses.
D. P. Rowe
John Branson
Inventor.
John Thomas
by his atty.

UNITED STATES PATENT OFFICE.

JOHN THOMAS, OF PHILADELPHIA, PENNSYLVANIA.

MEANS FOR REDUCING FRICTION BETWEEN SHIPS AND WATER.

SPECIFICATION forming part of Letters Patent No. 532,221, dated January 8, 1895.

Application filed February 3, 1894. Serial No. 498,960. (No model.)

*To all whom it may concern:*

Be it known that I, JOHN THOMAS, a subject of the Queen of England, residing at Philadelphia, in the county of Philadelphia and State of Pennsylvania, have invented certain new and useful Improvements in Means for Preventing Friction Between Ships and Water, of which the following is a specification, reference being had therein to the accompanying drawings.

My invention has reference to means for arresting friction between the sides of a ship and the water through which it is passing and consists of devices fully set forth in the following specification and accompanying drawings forming part thereof.

The specific object of my invention is to facilitate the passage of a steam ship through the water, and whereby the resistance offered to a ship is reduced to a minimum. With the minimum of power thus speed is augmented.

In my application, Serial No. 495,784, filed January 6, 1894, I show a device or mechanism for accomplishing a result similar to the object of the present invention. In the application above referred to I show a series of longitudinally moving plates, and moving in a direction contrary to the motion of the vessel.

The invention described in the following specification differs from the invention shown in the above designated application in having a series of laterally positioned rotating cylinders, instead of the longitudinal plates.

In the drawings like parts are referred to by marks or figures of a corresponding kind in the different views.

Figure 5:
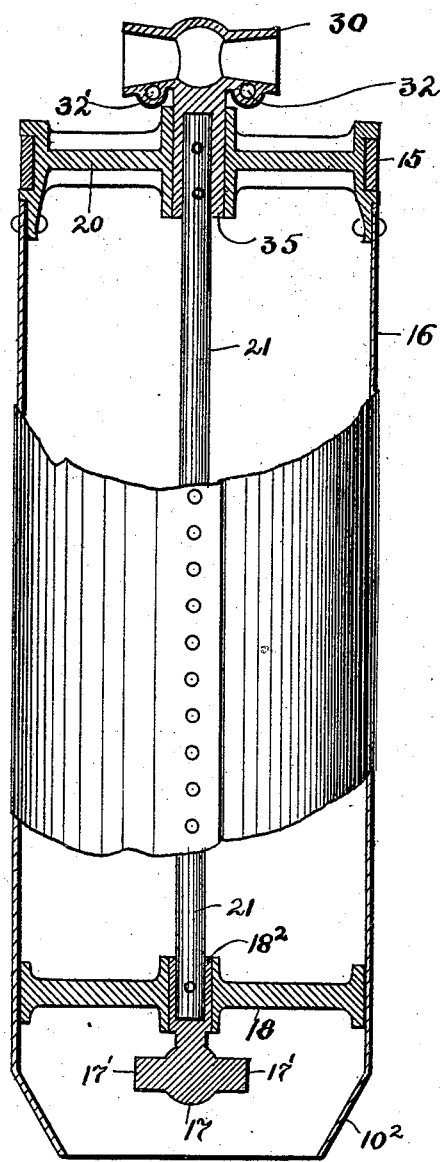
Figure 6:
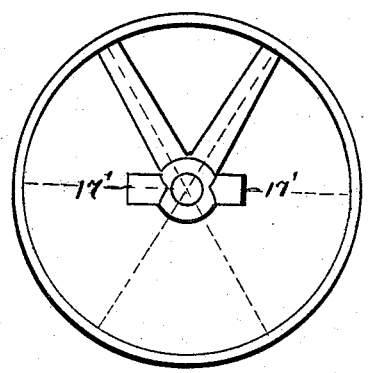
Figure 7:
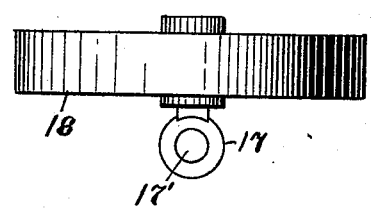
Figure 13:
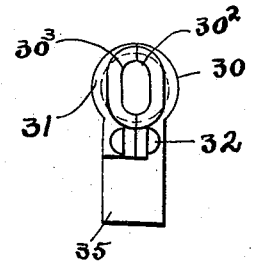

Figure 1 is a horizontal section of the ends of a ship having my improvement, A being the fore end and B the aft end thereof. Fig. 2 is a one half vertical transverse section of a vessel having my improvement, showing the connecting mechanism between my cylinders and the propeller shaft of the ship. Fig. 3 is a plan of a ship with my cylinders applied to one side thereof. Fig. 4 is a side elevation of a ship, with the position of my cylinders indicated by the dotted vertical lines. The cylinders themselves are not shown in this view. Fig. 5 is a part side elevation and part longitudinal section of one of the cylinders. Fig. 6 is a plan of the metallic ring which supports one end of the peripheral plate forming the cylinder proper. Fig. 7 is a side elevation of the ring shown in Fig. 6. Figs. 8, 9, 10 and 11 are diagrams explaining the principle involved in the invention. Fig. 12 is a plan of a portion of my invention showing the manner in which the power and motion are communicated to the cylinders. Fig. 13 is an end view of one of the parts forming the universal joints between the cylinders.

1 is the propeller shaft of the ship. To this shaft is fixed the propeller 2 in the usual manner of steamship construction. The shaft 1 is operated rotatively by the engine of the ship in the well known way. I do not, however, show any engine connection to this shaft in the drawings. To the shaft 1 is rigidly fixed a bevel gear 3, shown in Figs. 1, 2, 3, and 4. This gear operates its follower 4 and through intermediate bevels 5 and 6 and the shaft 5′, the belt wheel 7. This wheel 7 carries the endless belt or chain which communicates motion to all the cylinders on the side of the one on which it is located.

9, 9 are a series of idlers. These idlers are located on the inner side of the cylinders and their function is to compel the belt's engaging with the belt pulley on the end of the shaft supporting the upper cylinder. This pulley is designated by the numeral 10.

In speaking of the upper cylinder, it must be understood there are a series of upper cylinders extending lengthwise of the ship. Through each of the upper cylinders there is a central shaft indicated only by the dotted line c, Fig. 2. The position of this central supporting shaft is practically a vertical one, but as the sides of the ship are curvilinear it follows that cylinders located beneath the upper one have a changed angular position when viewed from either fore or aft. Therefore the central supporting shafts for these cylinders have a like changed angular position. This change of the angle in the position of these cylinders, when viewed as indicated is shown in Fig. 2, where D represents the second cylinder, E the third, and F the fourth. When viewed laterally these cylinders occupy parallel and vertical positions. To accommodate the requirements of this changed angular relation on the part of the cylinders, the cylinder C, in Fig. 2, operates the cylinder D through a universal joint. Cylinder D operates cylinder E and E operates F in a like manner. The particular construction of the universal joint is not material to my invention, though I show in Figs. 5, 7 and 13 such a construction as I could employ, to be explained more at length hereinafter.

15, 15, 15 are the supporting bearings for the cylinders. These bearings could be constructed in many different ways, but I show them as consisting of metallic rings held in a groove in the cylinder, shown best in the sectional part of Fig. 5, and there rigidly secured to the side of the ship, as shown in Fig. 2. By this construction they offer the least resistance to the water.

$10^2$ is an inverted cone shaped end of the cylinders. This permits of the upper cylinder to partially insert its lower end into that of its neighbor, as shown in Fig. 2.

The forward wheel 11 can be provided with radial fans as shown in Fig. 1. When thus constructed it is in effect a lateral propeller.

$A^2$, Figs. 1 and 3, indicates the direction in which the ship is moving. The arrow $A'$ same figures indicates the direction in which the cylinder 10, 10, rotate. The shaft 1 is propelled in the proper direction to accomplish these results.

Figs. 5, 6, 7 and 13 refer to structural features of the lateral cylinders. These cylinders are all constructed in substantially the same way and a description of one will answer for all.

21 is the central shaft. This shaft is represented by the dotted lines C, D, E, and F. At the upper end of this shaft 21 is secured by keys or pins the female portion of a universal joint. This portion of the joint consists of two concave parts having integrally projecting laterally extending slotted arms. One of these parts is shown in end view at 30, Fig. 13, and the other at 31 same figure. They are held together by bolts or rivets 32 shown only in Fig. 13. $32'$, $32'$, Fig. 5, show the hole in which these pins, bolts, or rivets, are inserted. One of the parts 30 forming this female portion of the universal joint, has a cylindrical shaped integral stem shown at 35. To this stem is the shaft or rod 21 secured rigidly. The plate supporting ring 20 is in turn supported to the aforementioned stem 35.

$17'$, $17'$ are two laterally projecting integral stems of the globular portion 17 of the male portion of the universal joint. Fig. 7 shows an end view of these stems, and Fig. 6 a plan thereof. To the globular shaped head of this male portion of the universal joint 17 is also integrally fixed a hollow stem $18^2$ shown in section in Fig. 5. The rod 21 is inserted into this hollow stem and pinned thereto. The ring 18 is secured to this stem $18^2$, and the plate 16 is riveted to the rings 18 and 20. The globular shaped portion of the male joint 17 is of a diameter to correspond to that of the hollow sphere and shown by the dotted line in Fig. 13 of the female, and the slots $30^3$ and $30^2$ of the projecting arms 30 form an oblong hole, when these arms are united, as shown in Fig. 13, and this hole at its smallest diameter should correspond to the diameter of the lugs $17'$, $17'$ as these lugs $17'$, $17'$ play in this oblong hole described. One of these joints intervenes between the driving cylinder and its follower or the driven one. Thus C becomes the driver for D, D for E and E for F in the manner described.

Figs. 8, 9, 10 and 11 are diagrams illustrating broadly the principle involved in my invention.

Let $H^0$ Fig. 8 represent a molecule of water. Now while the ship travels from $O'$ to O the cylinders rotating in a direction reverse to the normal motion of the ship, will have the effect theoretically and practically to deliver the molecule from one cylinder to the other until it will have moved around and passed all the cylinders intervening between the point $H^0$ and H which represent the actual movement of the ship, and thus the molecule will have remained stationary. It must of course be understood that what is true of one molecule is also true of all the molecules composing the entire body of water in contact with the sides of the ship.

In Figs. 11 and 10 where a vessel without my improvement moves from $p$ to $p'$ the molecule of water will be carried from $H'$ to $H^2$.

Having now described my invention, what I claim as new, and desire to secure by Letters Patent, is—

1. A ship provided with a series of laterally disposed friction reducing cylinders, arranged in vertical groups, said groups being fixed and held individually each to a common rotatable support and adapted to come in direct contact with the water and a connecting mechanism between a prime mover for each of said rotatable supports and the motor mechanism of the ship.

2. A steam ship provided with a series of laterally disposed rotating cylinders moving in a direction, rotatably, contrary to the normal motion of the ship arranged in vertical groups and each group being operatively united by universal joints and the outer periphery of said cylinders adapted to come in direct contact with the water, substantially as described for the purpose set forth.

3. The combination, in a means to reduce friction between the sides of a ship and the water, of a propeller shaft, a series of laterally disposed rotating cylinders rotating in a direction contrary to the normal motion of the ship, and a connecting mechanism between the said propeller shaft and the said cylinder consisting of the bevtl gear 3 mounted on the shaft 1, the follower 4 and the intermediate mechanism operating the cylinder operating endless belt 8, substantially as described.

4. The combination, as a means to reduce friction between the sides of a ship and the water, of a propeller shaft, a series of laterally disposed rotating cylinders with their axes parallel and arranged in vertical groups, each group having its component cylinders connected by universal joints and the entire series of cylinders adapted to come in direct contact with the water, a connecting mechanism between the said propeller shaft and the cylinders aforesaid, substantially as described for the purpose set forth.

5. The combination, in a means to reduce friction between the sides of a ship and the water, of a propeller shaft, a series of laterally disposed rotating cylinders, arranged in vertical banks or groups and universal joints interposed between the cylinders composing the respective groups, whereby the rotating of the propeller shaft will operate all the cylinders of all the groups substantially as described for the purpose set forth.

In testimony whereof I affix my signature in presence of two witnesses.

JOHN THOMAS.

Witnesses:
HOMER A. HERR,
FRANK M. WIRGMAN.